Patented June 21, 1932

1,863,990

UNITED STATES PATENT OFFICE

WILLIAM K. NELSON, OF CHICAGO, ILLINOIS, ASSIGNOR TO UNIVERSAL GYPSUM & LIME CO., OF CHICAGO, ILLINOIS, A CORPORATION OF DELAWARE

COMPOSITION CONSTRUCTION OR INSULATING MATERIAL

No Drawing.  Application filed December 18, 1929. Serial No. 415,114.

My invention relates to novel compositions of matter and particularly to materials such as wall plasters, mortars and compositions moldable into various shapes for various uses, and to materials which in final form will be highly cellular and well adapted for various construction and heat and sound insulating purposes.

Plastic mixtures for various construction uses and purposes are now commonly made by gauging water with such calcareous materials as calcined gypsum, Portland and other cements, hydrated lime, clay and the like. The surface tension of a wet mixture of this class is relatively high and the dry particles of the cementitious base material offer substantial resistance to wetting by the mixing water. The physical mixing of such compositions, therefore, involves much time and labor and, even under favorable conditions and thorough agitation, the resulting mix is not of a uniform and smooth consistency, it being practically impossible to prevent the formation of semi-dry and sticky lumps therein. Such mixes also require an excessive amount of water to make them of the desired workable consistency which is objectionable because it requires additional drying time or heat to eliminate the excess water and it also diminishes the ultimate strength of the finished products.

One of the objects of my present invention is to improve such compositions by incorporating into them an agent or substance which will materially reduce their surface tensions, insure ready penetration or wetting of the dry particles by the mixing water, and make possible the easy production of mixes of smooth and uniform consistency in short time with little stirring or agitation and with a minimum of mixing water.

It is another object of this invention to employ in such a composition a substance which will greatly improve or increase the plasticity of the wet material and thus insure easy working or trowelling of the material without any rolling or dragging under the tool.

As above stated my invention is also applicable to cellular compositions for heat and sound insulating purposes. Such compositions are now made by gauging a powdered cementitious material with water in the presence of a gas, various kinds of substances being employed to entrap the gas within the wet mixture and thereby sustain the mass in a cellular state until it sets or becomes otherwise hardened.

The present invention aims to provide an insulating composition of the class mentioned which will be of a more uniform cellularity than has heretofore been produced, both as to the size and distribution of the cells, whereby the final product will be highly efficient in checking the flow or transmission of heat and sound.

In order to produce efficiently a satisfactory cellular structure for the purposes just mentioned, it is necessary to have the gas under complete control and to provide for its uniform distribution throughout the wet mass without any dissipation. I have also discovered that the mixing of the ingredients to produce the cellular structure and the control and distribution of the gas throughout the wet mixture can be accomplished much more easily and effectively if a suitable agent is employed in the mix capable of insuring ready and complete penetration of the dry particles of the major ingredients by the mixing liquid. I have further found that in order to produce successfully a multitude of bubbles or gas cells in a wet mixture of a material of a relatively high specific gravity, such as calcined gypsum or Portland cement, it is also necessary to reduce to the lowest minimum the surface tension of the wet mixture.

A further object of this invention is to provide an inexpensive and highly efficient agent or substance for use in such a cellular composition which shall be capable of functioning in combination with the other ingredients to insure quick and complete penetration of the dry solid particles by the liquid, reduction of the surface tension of the wet mixture to the lowest minimum, complete control and uniform distribution of the gas throughout the wet mixture, and free and easy mixing of the ingredients without dissipation of any of the gas and without any after expansion or falling back of the wet cellular mix.

Other objects of my invention will appear hereinafter.

I have discovered that the highly desirable results mentioned above can be accomplished by making use of a certain class of substances of a synthetic organic nature. The aforesaid class of substances can be described as sulphonic acids of alkylated aromatic polynuclear hydro-carbons and their respective salts. The substances I intend to use can also be expressed by the general chemical formula

in which C designates a polynuclear hydrocarbon, R an alkyl group such as $CH_3$, $C_2H_5$, $(CH_3)_2CH$ and their homologues and derivatives, $SO_3$ a sulphonic acid group, and M hydrogen or any metal. I prefer to use the agents or products obtained from condensing naphthalene sulphonic acid with either iso-propyl alcohol or iso-butyl alcohol. Either agent or product may be used individually or in combination with the other. These products may be either added to the mix in the form of a solution previously prepared or they may be added to the compound in a dry state, and then the compound added to the mixing liquid or the latter added to the compound, as may be desired.

In producing plasters, mortars and moldable compositions embodying my invention, any suitable base material in finely divided form may be employed such as calcined gypsum, Portland and other cements, hydrated lime, clay and the like.

A satisfactory formula for the production of a highly plastic lime putty is as follows: 100 parts by weight high calcium lime either in the hydrate or oxide form, ⅛ to ⅓ part by weight sodium salt of iso-propyl naphthalene sulphonic acid, and sufficient water (from 100 to 300 parts by weight) to make a workable putty of the desired consistency.

For the production of a very dense and hard Portland cement plaster, I have used the following formula: 100 parts by weight Portland cement, ¼ to ½ part by weight sodium salt of iso-pyropyl naphthalene sulphonic acid, and sufficient gauging water (from 30 to 35 parts by weight) to make a plastic mix.

In making cellular compositions embodying my invention, any suitable powdered cementitious material such as calcined gypsum, Portland or other cements may be used as the major ingredient. I prefer, however, to use gypsum either in the pure state or as an admixture in combination with other materials such as talc, ground silica, clay, ground limestone, lime, cement and the like. The gas employed for creating the bubbles or cells in the wet mixture may be air, carbon dioxide, hydrogen or the like. I prefer, however, in combination with gypsum to use a gas, for example—carbon dioxide gas, produced in situ from the chemical interaction with water of substances such as aluminum sulphate and calcium carbonate.

A satisfactory formula for the production of a final cellular product weighing approximately 5 pounds per cubic foot is as follows:

50 parts by weight calcined gypsum,
9½ parts by weight aluminum sulphate,
6½ parts by weight calcium carbonate, and
1/40 parts by weight sodium salt of iso-propyl naphthalene sulphonic acid.

The above mixture is gauged with the proper amount of water which I have found to be between 60 and 75% by weight of the dry mix, depending largely upon the original normal consistency or water carrying capacity of the calcined gypsum and its age.

For the production of a final cellular product weighing approximately 10 pounds per cubic foot, I have used the following formula:

100 parts by weight calcined gypsum,
9½ parts by weight aluminum sulphate,
6½ parts by weight calcium carbonate, and
1/80 parts by weight sodium salt of iso-propyl naphthalene sulphonic acid.

The above mixture is gauged with the proper amount of water which as explained above will be from 60 to 75% by weight of the dry mix.

When using gypsum as the major ingredient in the presence of a gas for making a cellular composition, I have found that, once the quantity of gas required for whatever the final weight of the cellular material desired has been determined, the volume of gas can remain constant; and for a product double the weight per unit volume, it is merely necessary to use double the amount of the major ingredient. For example, the formula given above for 10 pound material will be suitable for 20 pound material if the quantity of gypsum is doubled, and it will also be suitable for 30 pound material if 300 parts of gypsum are used in lieu of 100 parts. These results are made possible because of the high efficiency of the gas entangling agent employed with which practically no gas is permitted to escape.

In making a very strong cellular product weighing in final form approximately 30 pounds per cubic foot, I have used the following formula:

100 parts by weight Portland cement,
2/10 parts by weight metallic powdered aluminum,
½ part by weight hydrated lime, and
1/40 parts by weight sodium salt of iso-propyl naphthalene sulphonic acid.

The ingredients in dry form are then gauged with the proper amount of water which I found to be from 35 to 40% by weight of the dry mix.

In the formulas given above I have specified the sodium salt of iso-propyl naphthalene sulphonic acid as the controlling agent. Substantially the same results can be obtained by the use of the sodium salt of iso-butyl naphthalene sulphonic acid, also by the use of the free sulphonic acids of said organic compounds. I have found that any one of the agents mentioned can be used interchangeably or in combination with each other.

The relatively very small quantities of the synthetic organic products specified above when used in wet plasters, mortars and moldable compositions have the valuable properties of reducing the surface tensions of the mixtures to a very great extent and of increasing the wetability of the dry materials in the presence of water.

The use of very small quantities of these agents in such compositions not only greatly increases the penetration or wetting of the individual particles of the major ingredients by the mixing water but such penetration or wetting is accomplished in much less time and in a much more uniform manner than is possible without their use. As a result of such improved penetration or wetting by water of the dry particles, wet mixing proceeds in an easy and free manner and without the formation of any semi-dry or sticky lumps therein. The gauging of the dry powdered material is readily accomplished with a minimum effort and the resulting mix is of a uniform and smooth consistency.

The aforesaid agents cause the cementitious or plastic material to work well and trowel smoothly with a minimum of effort and without any rolling or dragging under the tool. When hydrated lime containing even relatively small amounts of these agents is permitted to soak for the usual time its plasticity becomes greatly improved.

In every case the gauging water penetrates quickly and completely each individual dry particle of the base material without the usual formation of highly colloidal gels and without the absorption of an excess amount of water over that actually required. The advantage of reducing the "colloidally" absorbed water in the process of mixing plastic materials such as gypsum, cements, lime, clay and the like, will be readily apparent to anybody skilled in the art. The lower the percentage of mixing water used within the limits of that actually required in the case of gypsum and cement for hydration, the greater will be the tensile and compressive strengths of the composition in the finished state and also the less will be the time consumed in hardening and drying the same.

My improved plasters and compositions may be precast at a factory in the shapes desired, or the ingredients therefor may be supplied in dry form and shipped to the place of use where by the addition of the proper amount of water they may be readily prepared for use by any laborer.

The advantages noted above in connection with plasters, mortars and moldable compositions are also obtainable in the case of cellular compositions by the use of the relatively small quantities of the aforesaid synthetic organic agents. The surface tension of the wet aerated mixture is reduced to a very low point which permits the successful production of a multitude of bubbles in the mix. Complete and quick penetration of the dry particles of the major ingredient by the liquid makes it possible to mix the wet mass much more uniformly and easily and the gas becomes distributed much more effectively than has been possible heretofore.

I have noted that an expanded or cellular mass in the wet state made in accordance with my invention is so completely stabilized that additional mixing, even after full expansion has taken place, has no damaging or breaking down effect on the cellular structure. The gas becomes so completely and uniformly distributed throughout the whole plastic mix, practically instantaneously, that the expansion takes place without any halting or delay and the mass remains thereafter unchanged either as to additional swelling or falling back. Even the stabilized wet cellular product which is used to make a final product weighing but five pounds to the cubic foot does not crack or fall back when setting. As shown by my formulas the amount of gauging water for a material as light as 5 lbs. per cubic foot is no more than that required for a material double its weight. Such results cannot be obtained by the use of any of the agents heretofore used, so far as I am aware.

My improved cellular composition may be precast at a factory in the form of partition tile, slabs, panels, sheets and the like or the ingredients for the products may be supplied in dry form and transported to the place of use where, merely by the addition of the proper amount of water, the composition may be readily cast by any unskilled laborer in suitable molds or forms. The cellular compositions are well adapted for various construction, heat and sound insulating and fireproofing uses.

While I have described my invention in detail, I do not wish to limit it thereto or thereby as some of the ingredients mentioned may be omitted, other ingredients may be employed, changes may be made in the proportions of the ingredients and changes may also be made in the manner of compounding the ingredients all without departing from the spirit or principles of the invention.

I claim:—

1. A moldable composition material resulting from a mixture comprising water, an inorganic, calcareous, construction material having plastic properties as the major ingredient and selected from the group consisting of calcined gypsum, Portland cement, hydrated lime and clay, and a substance selected from the group consisting of sulphonic acids of alkylated aromatic polynuclear hydro-carbons and salts thereof.

2. A moldable composition material resulting from a mixture comprising water, an inorganic, calcareous, construction material having plastic properties as the major ingredient and selected from the group consisting of calcined gypsum, Portland cement, hydrated lime and clay, and a sulphonic acid of alkylated naphthalene.

3. A moldable composition material resulting from a mixture comprising water, an inorganic, calcareous, construction material having plastic properties as the major ingredient and selected from the group consisting of calcined gypsum, Portland cement, hydrated lime and clay, and the sodium salt of a sulphonic acid of alkylated naphthalene.

4. A moldable composition material resulting from a mixture comprising water, an inorganic, calcareous, construction material having plastic properties as the major ingredient and selected from the group consisting of calcined gypsum, Portland cement, hydrated lime and clay, and the sodium salt of iso-propyl naphthalene sulphonic acid.

5. A moldable composition material resulting from a mixture comprising 100 parts by weight of an inorganic, calcareous, construction material having plastic properties and selected from the group consisting of calcined gypsum, Portland cement, hydrated lime and clay, sufficient water to make a workable plastic mix, and 1/80 to 1/2 part by weight of a substance selected from the group consisting of iso-propyl naphthalene sulphonic acid, iso-butyl naphthalene sulphonic acid, and the respective salts of said acids.

6. A dry mixture for gauging with water and suitable for making self-sustaining casts and comprising an inorganic, calcareous, construction material having plastic properties as the major ingredient and selected from the group consisting of calcined gypsum, Portland cement, hydrated lime and clay, and a substance selected from the group consisting of sulphonic acids of alkylated aromatic polynuclear hydro-carbons and salts thereof.

7. A dry mixture for gauging with water and suitable for making self-sustaining casts and comprising an inorganic, calcareous, construction material having plastic properties as the major ingredient and selected from the group consisting of calcined gypsum, Portland cement, hydrated lime and clay, and a sulphonic acid of alkylated naphthalene.

8. A dry mixture for gauging with water and suitable for making self-sustaining casts and comprising an inorganic, calcareous construction material having plastic properties as the major ingredient and selected from the group consisting of calcined gypsum, Portland cement, hydrated lime and clay, and the sodium salt of a sulphonic acid of alkylated naphthalene.

9. A dry mixture for gauging with water and suitable for making self-sustaining casts and comprising an inorganic, calcareous, construction material having plastic properties as the major ingredient and selected from the group consisting of calcined gypsum, Portland cement, hydrated lime and clay, and the sodium salt of iso-propyl naphthalene sulphonic acid.

10. A dry mixture for gauging with water and suitable for making self-sustaining casts and comprising 100 parts by weight of an inorganic, calcareous, construction material having plastic properties and selected from the group consisting of calcined gypsum, Portland cement, hydrated lime and clay, and 1/80 to 1/2 part by weight of a substance selected from the group consisting of iso-propyl naphthalene sulphonic acid, iso-butyl naphthalene sulphonic acid, and the respective salts of said acids.

11. A composition material of a cellular texture resulting from a mixture comprising water, an inorganic material having plastic properties and capable of setting in the presence of water as the major ingredient, a gas for forming bubbles in the mixture, and a substance selected from the group consisting of sulphonic acids of alkylated aromatic polynuclear hydro-carbons and salts thereof.

12. A composition material of a cellular texture resulting from a mixture comprising water, an inorganic material having plastic properties and capable of setting in the presence of water as the major ingredient, a gas for forming bubbles in the mixture, and a sulphonic acid of alkylated naphthalene.

13. A composition material of a cellular texture resulting from a mixture comprising water, an inorganic material having plastic properties and capable of setting in the presence of water as the major ingredient, a gas for forming bubbles in the mixture, and the sodium salt of a sulphonic acid of alkylated naphthalene.

14. A composition material of a cellular texture resulting from a mixture comprising water, an inorganic material having plastic properties and capable of setting in the presence of water as the major ingredient, a gas for forming bubbles in the mixture, and the sodium salt of iso-propyl naphthalene sulphonic acid.

15. A composition material of a cellular texture resulting from a mixture comprising 50 to 300 parts by weight of calcined gypsum, sufficient water to make a workable plastic mix, 9 1/2 parts by weight of aluminum sulphate, 6 1/2 parts by weight of calcium carbonate, 1/40 to 1/80 part by weight of a substance selected from the group consisting of iso-propyl naphthalene sulphonic acid, iso-butyl naphthalene sulphonic acid, and the respective salts of said acids.

16. A dry mixture for gauging with water and for making cellular casts and comprising an inorganic material having plastic properties and capable of setting in the presence of water as the major ingredient, a chemically reactive gas generating agent for producing bubbles, and a substance selected from the group consisting of sulphonic acids of alkylated aromatic polynuclear hydro-carbons and salts thereof.

17. A dry mixture for gauging with water and for making cellular casts and comprising an inorganic material having plastic properties and capable of setting in the presence of water as the major ingredient, a chemically reactive gas generating agent for producing bubbles, and a sulphonic acid of alkylated naphthalene.

18. A dry mixture for gauging with water and for making cellular casts and comprising an inorganic material having plastic properties and capable of setting in the presence of water as the major ingredient, a chemically reactive gas generating agent for producing bubbles, and the sodium salt of a sulphonic acid of alkylated naphthalene.

19. A dry mixture for gauging with water and for making cellular casts and comprising an inorganic material having plastic properties and capable of setting in the presence of water as the major ingredient, a chemically reactive gas generating agent for producing bubbles, and the sodium salt of iso-propyl naphthalene sulphonic acid.

20. A dry mixture for gauging with water and for making cellular casts and comprising 50 to 300 parts by weight of calcined gypsum, 9 1/2 parts by weight of aluminum sulphate, 6 1/2 parts by weight of calcium carbonate, and 1/40 to 1/80 part by weight of a substance selected from the group consisting of iso-propyl naphthalene sulphonic acid, iso-butyl naphthalene sulphonic acid, and the respective salts of said acids.

WILLIAM K. NELSON.

DISCLAIMER 1,863,990.—*William K. Nelson*, Chicago, Ill. COMPOSITION CONSTRUCTION OR INSULATING MATERIAL. Patent dated June 21, 1932. Disclaimer filed October 19, 1939, by the assignee, *Universal Gypsum & Lime Co.*

Hereby enters this disclaimer as to the subject matter of claims 11, 12, 13, and 14 in said patent.

[*Official Gazette November 7, 1939.*]